(12) United States Patent
Frank et al.

(10) Patent No.: US 7,876,868 B2
(45) Date of Patent: Jan. 25, 2011

(54) SYSTEM AND METHOD FOR REDUCING INTERFERENCE IN AN ORTHOGONAL FREQUENCY DIVISION MODULATION SYSTEM

(75) Inventors: Colin D. Frank, Park Ridge, IL (US); Robert J. Corke, Glen Ellyn, IL (US); Jorge L. Seoane, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 843 days.

(21) Appl. No.: 11/621,384

(22) Filed: Jan. 9, 2007

(65) Prior Publication Data

US 2008/0165867 A1 Jul. 10, 2008

(51) Int. Cl.
H03D 1/06 (2006.01)
H04K 1/10 (2006.01)

(52) U.S. Cl. .................. 375/348; 375/260
(58) Field of Classification Search .......... 375/260, 375/348, 259, 345, 316
See application file for complete search history.

(56) References Cited

U.S. PATENT DOCUMENTS

| | | | |
|---|---|---|---|
| 6,317,600 B1 | 11/2001 | Salonaho | |
| 6,711,123 B1 | 3/2004 | Taira | |
| 7,023,265 B1* | 4/2006 | Helard et al. | 329/320 |
| 7,130,293 B2 | 10/2006 | Hanada | |
| 2003/0063678 A1* | 4/2003 | Crawford | 375/260 |
| 2005/0008085 A1* | 1/2005 | Lee et al. | 375/260 |
| 2006/0159006 A1 | 7/2006 | Yeon | |
| 2006/0233268 A1 | 10/2006 | Frank et al. | |
| 2008/0118012 A1* | 5/2008 | Corke et al. | 375/348 |

* cited by examiner

Primary Examiner—David C Payne
Assistant Examiner—Brian J Stevens
(74) Attorney, Agent, or Firm—Valerie M. Davis

(57) ABSTRACT

An interference contribution associated with a selected subcarrier of a plurality of subcarriers associated with a previously transmitted OFDM symbol or a current OFDM symbol is determined. A fast Fourier transform (FFT) output for the current OFDM symbol is also determined. The interference contribution is subtracted from the FFT output of the current OFDM symbol to form a modified FFT output.

19 Claims, 4 Drawing Sheets

SYSTEM AND METHOD FOR REDUCING INTERFERENCE IN AN ORTHOGONAL FREQUENCY DIVISION MODULATION SYSTEM

TECHNICAL FIELD

The field of the invention relates to communications made within networks and to reducing interference within these networks.

BACKGROUND

Various types of protocols have been used to transmit information within Orthogonal Frequency Division Modulation (OFDM) systems. For example, Institute of Electrical and Electronic Engineers (IEEE) 802.11 standard protocols have sometimes been used to facilitate the transmission of OFDM symbols in these networks. In these systems, the OFDM symbols include a plurality of subcarriers and groups of symbols can be transmitted together with a preamble in the form of a frame or packet.

As information is transmitted, several types of noise or interference can occur within OFDM systems. For example, intersymbol interference occurs in a given subcarrier of the current OFDM symbol and this interference is attributable to transmissions made in the same subcarrier of some other OFDM symbol. In addition, inter-tone interference also occurs and is caused by other tones in the current or other OFDM symbols. Different metrics can be used to measure and compare the amount of interference in the system or within a current transmission. For example, one measure of the interference in a system is the Signal/Interference (S/I) ratio.

Interference cancellation has not been implemented in typical previous OFDM systems. As a result, the S/I ratio in these systems is limited. When the S/I ratio is limited, the use of higher data rates (such as those used in 16 and 64 Quadrature Amplitude Modulation (QAM) systems) is essentially impossible to achieve. In addition, the maximum S/I limitation desenses the receiver so that the range of communication links in the system is reduced. As a result of these problems, the quality of communications made in previous OFDM systems has often become degraded, and user satisfaction with these systems has suffered.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
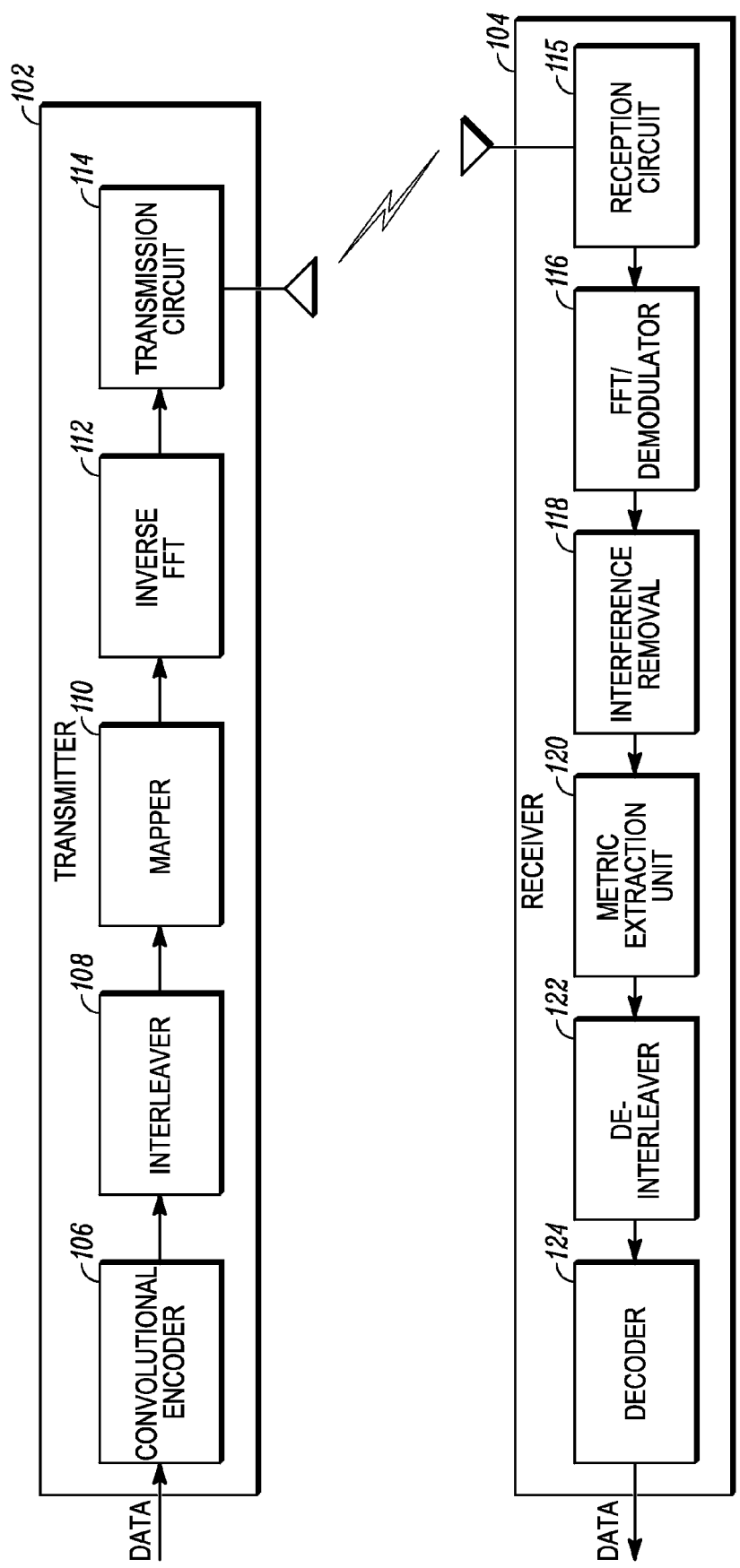
FIG. 1 is a block diagram of a system for reducing noise in an OFDM network according to various embodiments of the present invention.

Before describing in detail embodiments that are in accordance with the present invention, it should be observed that the embodiments reside primarily in combinations of method steps and apparatus components related to a method and apparatus for interference removal in an OFDM system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for interference removal in an OFDM system described herein. The non-processor circuits may include, but are not limited to, a radio receiver, a radio transmitter and user input devices. As such, these functions may be interpreted as steps of a method to perform the interference removal in an OFDM system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, a system and method are provided that remove noise from transmissions made in OFDM systems. The approaches described herein result in an improved quality of transmitted information, significantly higher S/I ratios, and, consequently, the ability to utilize higher transmission rates in OFDM systems. In so doing, system performance is improved and the user experience with the system is enhanced.

In many of these embodiments, an interference contribution associated with a selected subcarrier of a plurality of subcarriers associated with a previously transmitted OFDM symbol is determined. A fast Fourier transform (FFT) output for a current OFDM symbol is also determined. The interference contribution is subtracted from the FFT output of the current OFDM symbol to form a modified FFT output.

In some of these examples, the FFT output of the current OFDM symbol is a vector having a plurality of components and each component is associated with a subcarrier of the current OFDM symbol. In other examples, the FFT output may be a single subcarrier.

In others of these embodiments, a first interference contribution from a first selected subcarrier of a plurality of subcarriers associated with a current OFDM symbol is determined. An FFT output of the current OFDM symbol is also determined. The first interference contribution of the first selected subcarrier of the current symbol is subtracted from the FFT output of the current OFDM symbol to form a modified FFT output. Those skilled in the art will realize that the above recognized advantages and other advantages described herein are merely exemplary and are not meant to be a complete rendering of all of the advantages of the various embodiments of the present invention.

Referring now to FIG. 1, one example of a system for removing noise from OFDM transmissions is described. The system includes a transmitter 102 and a receiver 104. The transmitter 102 includes a convolutional encoder 106, an interleaver 108, a mapper 110, an inverse FFT 112, and a transmission circuit 114. The receiver 104 includes a reception circuit 115, a FFT/demodulator 116, an interference removal module 118, a metric extraction unit 120, a de-interleaver 122, and a decoder 124.

At the transmitter 102, binary data is received by the convolutional encoder 106. The convolutional encoder 106 encodes the binary data and outputs a sequence of binary code symbols. Next, the interleaver 108 interleaves the data so that bursts of unreliable symbols that may be present in the received data are randomly located when presented to the decoder. The encoded and interleaved data is next processed by the mapper 110, which divides the data into groups and converts the data into complex numbers according to Binary Phase Shift Keying (BPSK) modulation, Quadrature Phase Shift Keying (QPSK) modulation, 16 Quadrature Amplitude Modulation (QAM), 64 QAM, or some other type of modulation technique, thereby, generating one subcarrier modulation symbol per subcarrier for a plurality of subcarriers associated with an OFDM symbol. The Inverse FFT 112 transforms the subcarrier modulation symbol sequence to a sampled time sequence. In one implementation a cyclic prefix is prepended to the sampled time sequence. In other implementations, a cyclic suffix can be appended. The transmission circuit 114 includes amplifiers and/or filters to transmit the information across a transmission medium such as an air interface.

At the receiver 104, the data transmitted from the transmitter 102 is received at the reception circuit 115, which has amplifiers and/or filters to receive the information being sent over the transmission medium in the form of a sampled time sequence. The FFT/demodulator 116 demodulates the data using a FFT, thereby, transforming the sampled time sequence to a sequence of subcarrier modulation symbols. During this process, a window of samples of the received data is correlated with the complex conjugate of the complex sinusoid corresponding to each data subcarrier, and outputs a sequence of binary code symbols. The demodulated signal is sent to the interference removal module 118, which removes intersymbol and/or inter-tone interference. The interference removal process is described in greater detail herein. The metric extraction unit 120 determines the likelihood of a predetermined bit pattern occurring within the FFT output. For example, the metric extraction unit may determine the likelihood that a zero or one was transmitted for each binary code symbol. The de-interleaver 122 performs the reverse function of the interleaver 106 at the transmitter 102 (i.e., restoring the data to a non-interleaved state). Finally, the decoder 124 (e.g. a Viterbi decoder) decodes the deinterleaved binary code symbols, generating binary data that can be, for instance, presented to a user for usage.

In one example of the operation of the system of FIG. 1, an interference contribution associated with a selected subcarrier of a plurality of subcarriers associated with a previously transmitted OFDM symbol is determined by the interference removal module 118. A FFT output for a current OFDM symbol is also determined by the FFT/demodulator 116. The interference contribution is subtracted from the FFT output of the current OFDM symbol by the interference removal module 118 to form a modified FFT signal at the output of the interference removal module 118.

The FFT of the current OFDM symbol at the output of the FFT/demodulator 116 may be a vector having a plurality of components and each component is associated with a subcarrier of the current OFDM symbol. In other examples, the output of the FFT/demodulator 116 may be a single subcarrier.

In another example of the operation of the system of FIG. 1, an interference contribution from a selected subcarrier of a plurality of subcarriers associated with a current OFDM symbol is determined by the interference removal module 118. A FFT output of the current OFDM symbol is also determined by the FFT/demodulator 116. The interference contribution of the first selected subcarrier of the current symbol is subtracted from the FFT output of the current FFT symbol by the interference removal module 118 to form a modified FFT output.

As the span of the composite channel between the transmitter 102 and receiver 104 is increased, the number of OFDM symbols that can generate interference into the OFDM symbol of interest is increased. As mentioned, this interference can be partitioned into two categories: intersymbol interference from other OFDM symbols and inter-tone interference from other OFDM symbols as well as from the current OFDM symbol.

In this context, intersymbol interference refers to interference in a given subcarrier of the current OFDM symbol that is attributable to a modulation symbol (e.g., a QAM symbol if this type of modulation technique is used) in the same subcarrier of any other OFDM symbol. Intersymbol interference from neighboring OFDM symbols results whenever the length of the composite channel impulse response exceeds the length of a cyclic prefix, where the composite channel impulse response is defined as the convolution of the transmit filter, the receive filter, and the propagation channel between the transmitter and receiver. If the timing of the receiver is not properly aligned with the received signal, intersymbol interference can occur even when the length of the composite channel impulse response is less than that of the cyclic prefix. The variance of the intersymbol interference does not depend on the particular subcarrier, other than through the complex gain of the subcarrier.

Inter-tone interference refers to the loss of subcarrier orthogonality that can result when the length of impulse response is greater than the length of the cyclic prefix. Inter-tone interference occurs whenever the delay of a multipath element is such that the corresponding delayed copy of the OFDM symbol (80 samples long) only partially overlaps the FFT window (64 samples long). Whenever this occurs, the subcarriers of the received signal are not periodic over the FFT interval, and subcarrier orthogonality is lost. With proper timing in the receiver 104, no inter-tone interference will result so long as the length of the composite channel impulse response is less than or equal to the sum of the length of the cyclic prefix and one sampling interval (the inverse of the sampling frequency). It may be possible for a channel response to be longer than the cyclic prefix without the introduction of any inter-tone interference, as some multipath delays yield only intersymbol interference.

The variance of the inter-tone interference is not equal for all of the subcarriers, since a subcarrier in the center of the channel is interfered with by neighboring subcarriers that are both higher and lower in frequency, while a subcarrier at the bottom (top) of the channel is interfered with only by neighboring subcarriers that are higher (lower) in frequency. As a result, the variance of the inter-tone interference is least for a subcarrier at the edge of the channel, and greatest for a subcarrier in the center of the channel. More specifically, the variance of the inter-tone interference for the center-most subcarrier is approximately twice that of the outer-most subcarrier.

Let the sequence $\{f_i\}$ denote the impulse response of the composite channel sampled at 20 MHz, or more generally, at an inverse of the bandwidth of the OFDM signal. Since the IEEE 802.11a standard uses a 16 sample cyclic prefix, for an 802.11a-compliant OFDM symbol, it can be shown that every component $f_k$ of the channel impulse response (also referred to herein as a "channel coefficient") for k outside the interval $0 \leq k \leq 16$ produces intersymbol and/or inter-tone interference. The inter-tone and/or intersymbol interference associated with a particular channel coefficient depends both on the energy of the given coefficient and its position relative to the FFT window for the OFDM symbol. In general, the interference ($\gamma_k$) associated with channel coefficient $f_k$ is given by the following expression, as a function of k, where it has been assumed that the receiver FFT operates on a block of received samples in an interval [16, 79]. The multipath interference coefficient is:

$$\gamma_k = \gamma_{ISI,k} + \gamma_{ITI,k} \quad (1)$$

where the intersymbol interference coefficient $\gamma_{ISI,k}$ is given by $$\gamma_{ISI,k} = \begin{cases} 0 & 0 \leq k \leq 16 \\ \left(\frac{k-16}{64}\right)^2 & 17 \leq k \leq 79 \\ \left(\frac{k}{64}\right)^2 & -63 \leq k \leq -1 \\ 1 & |k| \geq 64 \text{ and } \mod(k, 80) \leq 16 \\ \left(\frac{\mod(k, 80) - 16}{64}\right)^2 + \left(\frac{80 - \mod(k, 80)}{64}\right)^2 & \text{otherwise} \end{cases} \quad (2)$$

and the inter-tone interference coefficient $\gamma_{ITI,k}$ is given by $$\gamma_{ITI,k} = \begin{cases} 0 & \mod(k, 80) \leq 16 \\ \frac{4}{52} \sum_{i=1}^{51} (52-i) \frac{\sin^2(\pi i (\mod(k, 80) - 16)/64)}{(64)^2 \sin^2(\pi i/64)} & \text{else} \end{cases} \quad (3)$$

In the above, the maximum value of $\{\gamma_k\}$ is 1.0, and the average value of the sequence $\{\gamma_k\}$ over all k, excluding the intervals $17 \leq k \leq 79$ and $-63 \leq k \leq -1$ is slightly less than 1.0. From (2) and (3), it can be seen that low-delay multipath in the intervals $\{f_k: 17 \leq k \leq 32\}$ and $\{f_k: -16 \leq k \leq -1\}$ contributes primarily inter-tone interference between subcarriers, while large-delay multipath outside the interval $\{f_k: -32 \leq k \leq 48\}$ contributes primarily intersymbol interference within the same subcarrier.

Intersymbol interference can be removed from the output of the FFT in the receiver more easily than inter-tone interference because intersymbol interference from any given subcarrier only interferes with the same subcarrier of subsequent OFDM symbols, whereas inter-tone interference interferes with all subcarriers of a subsequent OFDM symbol. For example, for an OFDM system in accordance with the 802.11a standard, intersymbol interference from the preceding OFDM symbol can be removed because, for any subcarrier, the QAM symbol in the same subcarrier of the preceding OFDM symbol can always be regenerated from the output of the decoder 124 before the metric calculation for this subcarrier of the current OFDM symbol is needed (except for rate ½ BPSK modulation and coding).

Let $\{f_k\}$ denote a composite channel that is both causal (so that $f_k = 0$ for all $k < 0$) and has an impulse response that is zero outside the interval $0 \leq k \leq 79$. Let the vector $\gamma_k$ denote the output of the FFT for the current OFDM symbol. Furthermore, let $g(l, n_1, n_2)$ be defined as $$g_P(l, n_1, n_2) = e^{\left(-j\frac{\pi l}{64}\right)(n_1 + n_2)} \frac{\sin\left(\frac{\pi l}{64}(n_1 - n_2)\right)}{64 \sin\left(\frac{\pi}{64}(n_1 - n_2)\right)} \quad (4)$$

and let the vector $h(n_1)$ of length 52 be defined as:

$$h(n_1) = (h(n_1, -26), h(n_1, -25), \ldots, \quad (5)$$
$$h(n_1, -1), h(n_1, 1), \ldots, h(n_1, 25), h(n_1, 26))^T$$
for $-26 \leq n_1 \leq 26$, where $$h(n_1, n_2) = \sum_{k=17}^{79} f_k g(k-16, n_1, n_2). \quad (6)$$

Let the vector $x_{k-1} = (x_{k-1,-26}, x_{k-1,-25}, \ldots, x_{k-1,25}, x_{k-1,26})$ denote the vector of QAM symbols comprising the k-1'st transmitted OFDM symbol. Given that the QAM symbol in j-th subcarrier of the preceding OFDM symbol has been regenerated after the binary code symbols from which it is mapped have been released by the decoder, the intersymbol interference (in the j-th subcarrier) associated with this QAM symbol can be removed from the FFT output, $y_k$, as follows:

$$y_k - x_{k-1,j}(0, \ldots, 0, h(j,j), 0, \ldots, 0,)^T, \quad (7)$$

where the vector $(0, \ldots, 0, h(j,j), 0, \ldots, 0,)^T$ is of length 52, and $h(j,j)$ is the j+27-th element of the vector if j<0, and the j+26-th element, otherwise.

Alternatively, the total interference associated with this QAM symbol can be removed by subtracting the total interference associated with this subcarrier, so that $$y_k - x_{k-1,j} h(j). \quad (8)$$

Similarly, given that the QAM symbol in j-th subcarrier of the current OFDM symbol has been regenerated after the binary code symbols from which it is mapped have been released by the decoder, the intersymbol interference (in the j-th subcarrier) associated with this current QAM symbol can be removed from the FFT output, $y_k$, as follows:

$$y_k + x_{k,j}(0, \ldots, 0, h(j,j), 0, \ldots, 0,)^T, \quad (9)$$

where the correction term is now added rather than subtracted as with the removal of the inter-tone interference associated with the previous symbol. The total interference associated with this QAM symbol can be removed by subtracting the total interference associated with this subcarrier, so that $$y_k + x_{k,j} h(j). \quad (10)$$

Again, in an approach, the correction term should be added for the removal of inter-tone interference from the previous symbol, whereas the correction term was added for the removal of inter-tone interference from the previous symbol.

For systems that operate according to IEEE 802.11-compliant protocols and utilize data rates that use 16 and 64-QAM modulation, the QAM symbols in the majority of preceding OFDM symbols can be regenerated from the re-encoded output of the decoder 124 prior to the calculation of decoder metrics for any subcarrier of the current OFDM symbol (except for rate ½ BPSK modulation and coding). As a result, a large portion of the interference from the preceding OFDM symbol can be removed before the computation of decoder metrics for the current OFDM symbol is begun. As the demodulation and decoding of the current OFDM symbol continues, additional QAM symbols from the preceding and current OFDM symbol are regenerated from the output of the decoder 124, and the corresponding intersymbol and inter-tone interference from these newly regenerated symbols can also be removed.

The regeneration of QAM symbols from subcarriers of the previous OFDM symbol can be used to remove all of the intersymbol interference associated with multipath in the interval $\{f_k: 17 \leq k \leq 79\}$, but only one-half of the associated inter-tone interference can be removed. The reason for this problem is that each multipath element in the interval $\{f_k: 17 \leq k \leq 79\}$ results in inter-tone interference from both the previous OFDM symbol and the current OFDM symbol. In one example, while the inter-tone interference from the preceding OFDM symbol can be removed, the inter-tone interference from the current OFDM symbol cannot until subcarriers of the current OFDM symbol can be regenerated.

Figure 2:
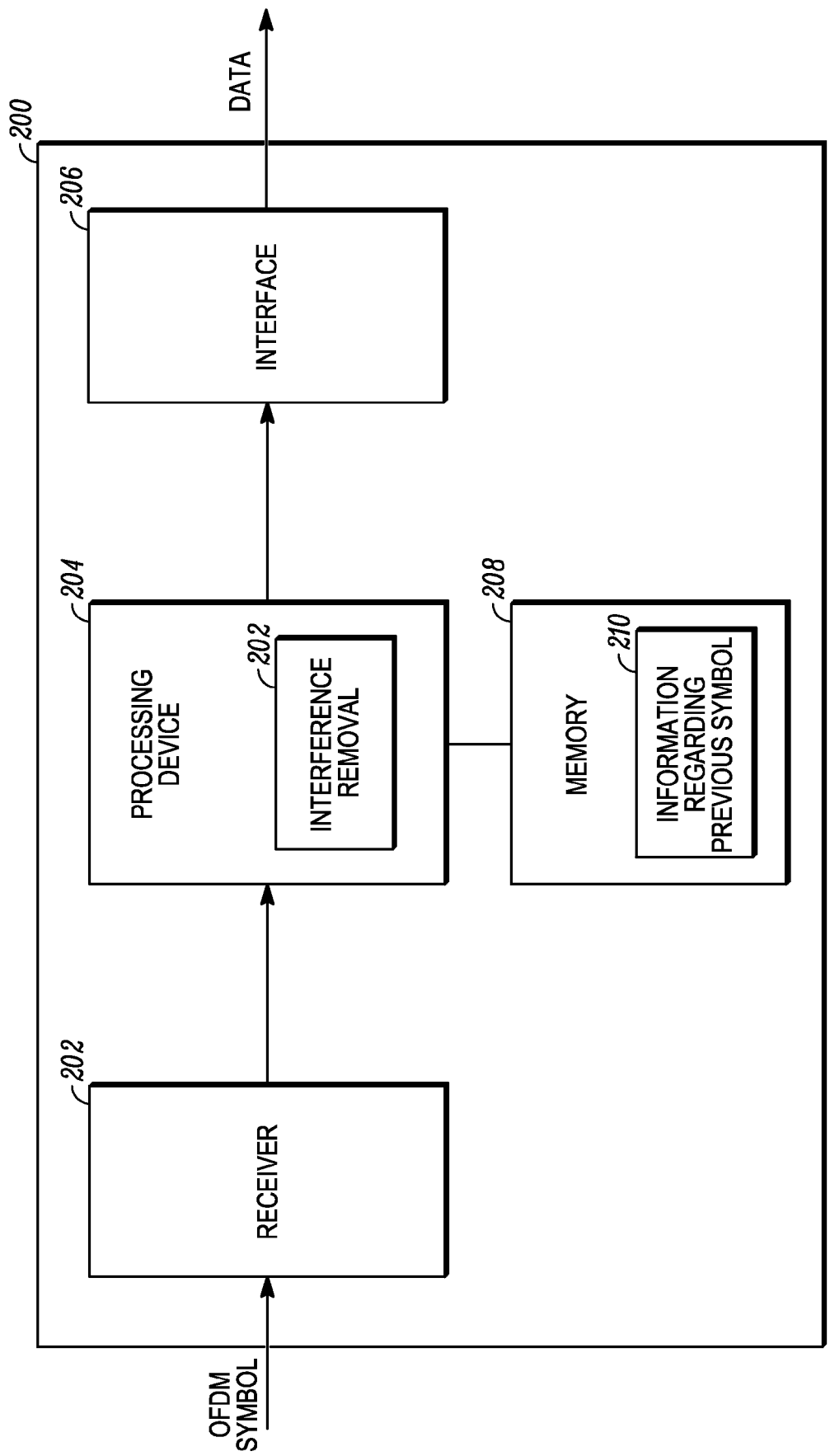
FIG. 2 is a block diagram of a device for reducing noise in an OFDM system according to various embodiments of the present invention.

Referring now to FIG. 2, a device 200 for reducing interference in an OFDM system includes a receiver 202, a processing device 204 including an interference module 205, an interface 206, and a memory 208. The processing device 204 includes an interference removal module 205 and the memory 208 includes information regarding previous symbol 210. Device 200 may further include a transmitter and comprise a communication device such as, for instance, a laptop, and Personal Data Assistant (PDA), etc. Device 200 is also in one implementation operable in accordance with IEEE 802.11 standards.

In one example of the operation of the system of FIG. 2, the receiver 202 receives a current OFDM symbol. The memory 208 stores information regarding a previously transmitted OFDM symbol 210.

The interference removal module 205 is adapted to determine a first interference contribution associated with a selected subcarrier of the previously transmitted OFDM symbol. In this regard, the interference removal module 205 may be a programmed software module operating at the processing device 204 in an embodiment. However such an implementation is not necessary but only exemplary. The processing device 204 determines an FFT output of the current OFDM symbol and interference removal module 205 subtracts the first interference contribution from the FFT output of the current FFT symbol to form a modified FFT. The modified FFT may be further processed (e.g., decoded, de-interleaved) and output by the interface 206 to a user.

In another example of the operation of the system of FIG. 2, the interference removal module 205 of the processing device 204 may be further adapted to determine a second interference contribution associated with a selected subcarrier of the current OFDM symbol. The interference removal module 205 subtracts the second interference contribution from the FFT output of the current FFT symbol to form the modified FFT output at the interface 206. The modified FFT may be further processed (e.g., decoded, de-interleaved) and output by the interface 206 to a user.

Figure 3:
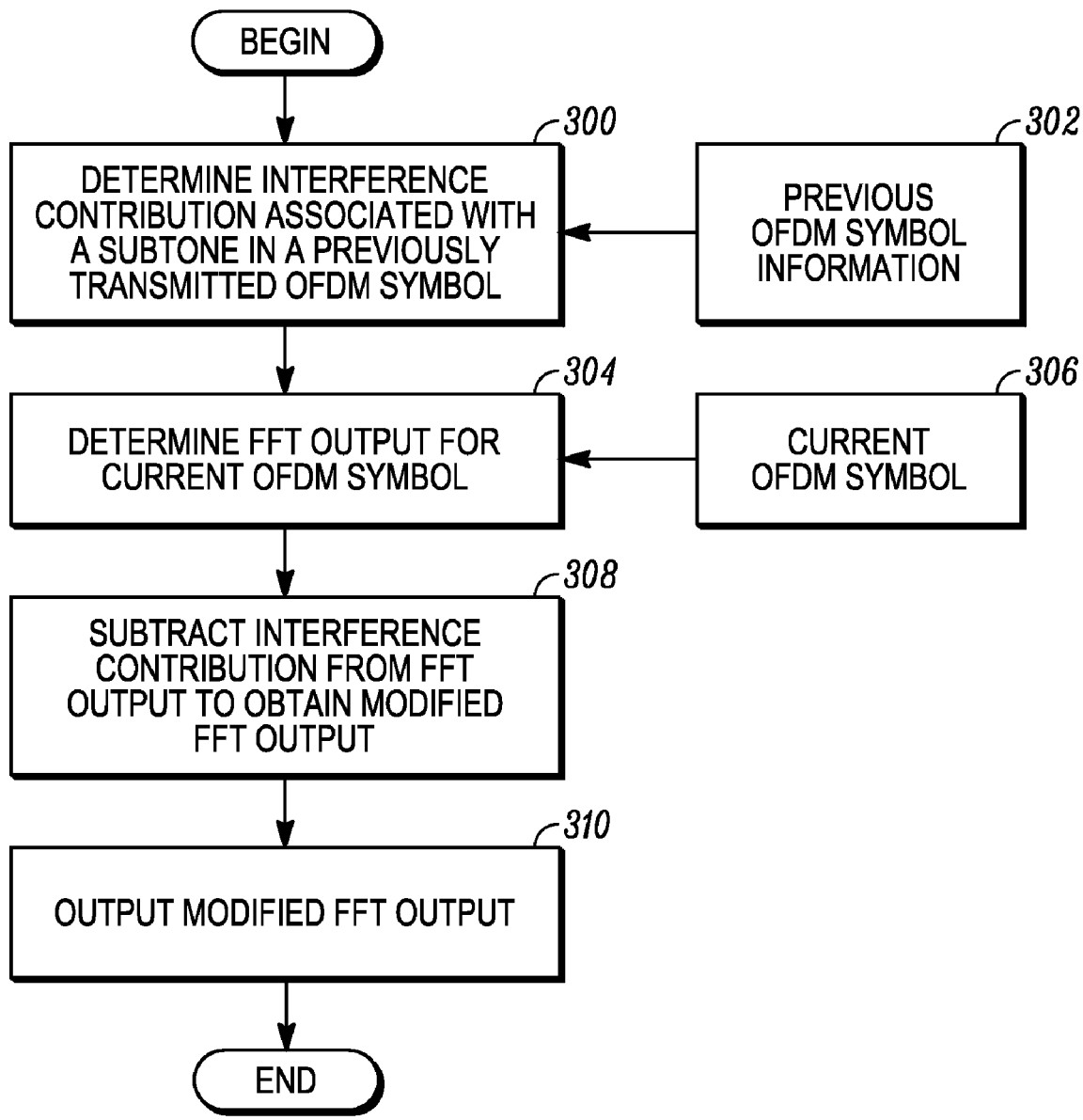
FIG. 3 is a flowchart of an approach for reducing noise in an OFDM system according to various embodiments of the present invention.

Referring now to FIG. 3, one example of an approach performed in interference module 205 for removing interference in an OFDM system is described. At step 300, an interference contribution associated with a sub-carrier in a previously transmitted OFDM symbol is determined. Previously determined OFDM symbol information 302 may be used for this purpose. At step 304, the FFT output for the current OFDM symbol may be determined. Received information 306 relating to the current OFDM symbol may be used for this purpose.

At step 308, the interference contribution associated with the sub-carrier of the previously transmitted symbol is subtracted from the FFT output to form a modified FFT output. At step 310, the modified FFT output is output. For example, further processing (e.g., decoding, de-interleaving) may be performed and then the processed signal may be output for use by a user.

Figure 4:
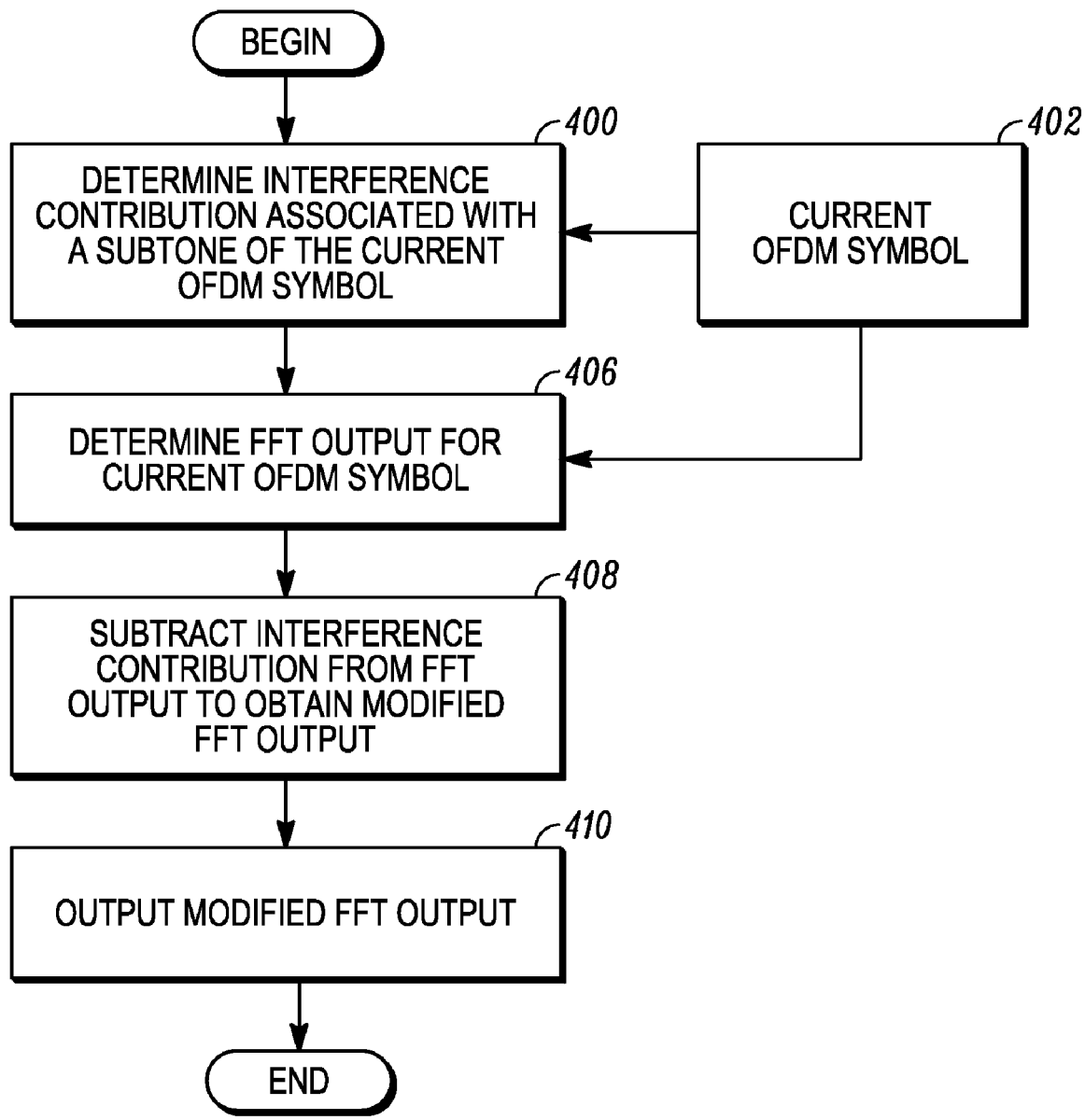
FIG. 4 is a flowchart of another approach for reducing noise in an OFDM system according to various embodiments of the present invention.

Referring now to FIG. 4, another example of an approach performed in interference module 205 for removing interference in an OFDM system is described. At step 400, an interference contribution associated with a subcarrier in the current OFDM symbol is determined. Current OFDM symbol information 402 may be used for this purpose. At step 406, the FFT output for the current OFDM symbol may be determined. Current symbol information 402 may be used for this purpose.

At step 408, the interference contribution associated with the subcarrier of the current symbol is subtracted from the FFT output to form a modified FFT output. At step 410, the modified FFT output is output. For example, further processing (e.g., decoding, de-interleaving) may be performed and then the processed signal may be output for use by a user.

Thus, approaches are provided that remove noise from transmissions made in OFDM systems. The approaches described herein result in an improved quality of transmitted information, significantly higher S/I ratios, and the ability to utilize higher transmission rates. In so doing, system performance is improved and user satisfaction with the system is enhanced.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method of reducing interference in an Orthogonal Frequency Division Modulation (OFDM) communication system comprising:

at a receiver:

receiving, from a transmitter, a current and a previously transmitted OFDM symbol;

determining an interference contribution associated with a selected subcarrier of a plurality of subcarriers associated with the previously transmitted OFDM symbol, wherein the interference contribution results from a length of a composite channel impulse response, between the transmitter and receiver, exceeding a guard interval, wherein the interference contribution is $x_{k-1}h(n_1)$ where:

$x_{k-1} = (x_{k-1,-26}, x_{k-1,-25}, \ldots, x_{k-1,25}, x_{k-1,26})$ and $h(n_1) = (h(n_1,-26), h(n_1,-25), \ldots, n(n_1,-1), h(n_1,1), \ldots, h(n_1,25), h(n_1,26))$ for $-26 \leq n_1 \leq 26$ where $$h(n_1, n_2) = \sum_{k=17}^{79} f_k g(k-16, n_1, n_2);$$

determining a fast Fourier transform (FFT) output for the current OFDM symbol; and subtracting the interference contribution from the FFT output of the current OFDM symbol to form a modified FFT output.

2. The method of claim 1 wherein the FFT output of the current OFDM symbol comprises a vector having a plurality of components, each component being associated with a subcarrier of the current OFDM symbol.

3. The method of claim 1 wherein the FFT output comprises a single subcarrier.

4. The method of claim 1 further comprising calculating at least one encoder metric associated with the modified FFT output.

5. The method of claim 4 wherein the at least one encoder metric comprises information indicating a likelihood of a predetermined bit pattern occurring within the FFT output.

6. The method of claim 1 further comprising:

determining a second interference contribution associated with a selected subcarrier of the current OFDM symbol, wherein the second interference contribution results from a length of a composite channel impulse response, between the transmitter and receiver, exceeding a guard interval; and subtracting the second interference contribution from the FFT output of the current OFDM symbol to form the modified FFT output.

7. The method of claim 1, wherein the interference contribution is determined from at least one modulation symbol that is regenerated from a re-encoded output of a decoder in the receiver.

8. A method of reducing interference in an Orthogonal Frequency Division Modulation (OFDM) communication system comprising:

at a receiver:

receiving, from a transmitter, a current OFDM symbol;

determining a first interference contribution from a first selected subcarrier of a plurality of subcarriers associated with the current OFDM symbol, wherein the first interference contribution results from a length of a composite channel impulse response, between the transmitter and receiver, exceeding a guard interval, wherein the first interference contribution is $x_k h(n_1)$ where:

$h(n_1) = (h(n_1,-26), h(n_1,-25), \ldots, h(n_1,-1), h(n_1,1), \ldots, h(n_1,25), h(n_1,26))^T$ for $-26 \leq n_1 \leq 26$ where $$h(n_1, n_2) = \sum_{k=17}^{79} f_k g(k-16, n_1, n_2) \text{ and}$$

$x_k = (x_{k,-26}, X_{k,-25}, \ldots, x_{k,25}, x_{k,26});$ determining a fast Fourier transform (FFT) output of the current OFDM symbol; and subtracting the first interference contribution from the FFT output of the current OFDM symbol to form a modified FFT output.

9. The method of claim 8 further comprising:

determining a second interference contribution associated with a second selected subcarrier of a previously transmitted OFDM symbol, wherein the second interference contribution results from a length of a composite channel impulse response, between the transmitter and receiver, exceeding a guard interval; and subtracting the second interference contribution from the FFT output of the current OFDM symbol to form the modified FFT output.

10. The method of claim 8 wherein the FFT output of the current OFDM symbol comprises a vector having a plurality of components, each of the plurality of components being associated with a subcarrier of the current OFDM symbol.

11. The method of claim 8 wherein the FFT output comprises a single subcarrier.

12. The method of claim 8 further comprising calculating at least one encoder metric associated with the modified FFT output.

13. The method of claim 12 wherein the at least one encoder metric comprises information indicating a likelihood of a predetermined bit pattern occurring within the FFT output.

14. The method of claim 8, wherein the interference contribution is determined from at least one modulation symbol that is regenerated from a re-encoded output of a decoder in the receiver.

15. An apparatus for reducing interference in communications conducted in an OFMD communication system comprising:

a receiver for receiving a current OFDM symbol;

a memory for storing information corresponding to a previously transmitted OFDM symbol; and a processing device coupled to the receiver, and the memory, the processing device being programmed to:

determine a first interference contribution associated with a selected subcarrier of the previously transmitted OFDM symbol, wherein the first interference contribution results from a length of a composite channel impulse response, between the transmitter and receiver, exceeding a guard interval, wherein the first interference contribution is $x_{k-1}h(n_1)$ where:

$x_{k-1} = (x_{k-1,-26}, x_{k-1,-25}, \ldots, x_{k-1,25}, x_{k-1,26})$ and $h(n_1) = (h(n_1,-26), h(n_1,-25), \ldots, h(n_1,-1), h(n_1,1), \ldots, h(n_1,25), h(n_1,26))^T$ for $-26 \leq n_1 \leq 26$, where $$h(n_1, n_2) = \sum_{k=17}^{79} f_k g(k-16, n_1, n_2)$$

determine an FFT output of the current OFDM symbol, and subtract the first interference contribution from the FFT output of the current OFDM symbol to form a modified FFT.

16. The apparatus of claim 15 wherein the processing device is further programmed to determine a second interference contribution associated with a selected subcarrier of the current OFDM symbol, wherein the second interference contribution results from a length of a composite channel impulse response, between the transmitter and receiver, exceeding a guard interval and wherein the processing device is programmed to subtract the second interference contribution from the FFT output of the current OFDM symbol to form the modified FFT output.

17. The apparatus of claim 15 wherein the FFT output of the current OFDM symbol is a vector having a plurality of components, each of the plurality of components being associated with a subcarrier of the current OFDM symbol.

18. The apparatus of claim 15 wherein the FFT output is for a single subcarrier.

19. The apparatus of claim 15, wherein the receiver includes a decoder, and the interference contribution is determined from at least one modulation symbol that is regenerated from a re-encoded output of the decoder.

* * * * *

UNITED STATES PATENT AND TRADEMARK OFFICE
CERTIFICATE OF CORRECTION

PATENT NO.       : 7,876,868 B2
APPLICATION NO.  : 11/621384
DATED            : January 25, 2011
INVENTOR(S)      : Frank et al.

It is certified that error appears in the above-identified patent and that said Letters Patent is hereby corrected as shown below:

In Column 10, Line 2, in Claim 1, delete "$h(n_1,26))$" and insert -- $h(n_1,26))^T$ --, therefor.

In Column 10, Line 4, in Claim 1, delete "$-26 \leq n_1 \leq 26$" and insert -- $-26 \leq n_1 \leq 26$, --, therefor.

In Column 10, Line 59, in Claim 8, delete "$-26 \leq n_1 \leq 26$" and insert -- $-26 \leq n_1 \leq 26$, --, therefor.

Signed and Sealed this
Seventeenth Day of July, 2012

David J. Kappos
*Director of the United States Patent and Trademark Office*